Patented Jan. 12, 1954

2,666,025

UNITED STATES PATENT OFFICE 2,666,025

PROCESS FOR POLYMERIZING VINYL-TYPE COMPOUNDS BY IRRADIATION

Kenzie Nozaki, Richmond, Calif., assignor to Shell Development Company, San Francisco, Calif., a corporation of Delaware No Drawing. Application May 2, 1949, Serial No. 91,022

15 Claims. (Cl. 204—158)

This invention relates to the polymerization of polymerizable unsaturated organic compounds. More particularly, the invention relates to a novel process for polymerizing photopolymerizable vinyl-type monomers to produce polymers having a relatively high and uniform molecular weight, and to the polymers produced thereby.

Specifically, the invention provides an efficient and economical process for producing relatively high and uniform molecular weight polymers from photopolymerizable vinyl-type compounds comprising monomers having a terminal methylene group joined through an ethylenic linkage to a carbon atom which is joined to a substituent other than hydrogen and to a carbon atom of an organic radical, and monomers having a terminal methylene group joined to an aliphatic carbon atom through an ethylenic linkage which is in conjugated relationship with another carbon-to-carbon ethylenic linkage, which comprises exposing the said vinyl-type monomers to light for a short period of time under specific conditions described hereinafter, and then removing the light and continuing the polymerization in the dark. The invention further provides polymers of the above-described vinyl-type monomers which possess many improved properties.

It is known that vinyl-type monomers, such as methacrylonitrile, may be polymerized to produce resins having many useful and valuable properties. The polymerization of these monomers is usually accomplished by exposing them to heat, light, catalysts, etc., until the material has been substantially completely polymerized. These conventional methods of polymerizing the vinyl-type monomers are not entirely satisfactory, however, as the polymers produced thereby are invariably made up of a great variety of different sized molecules and it has been found that polymers possessing such a wide distribution of molecular weights are difficult to process and yield products which have poor mechanical properties.

It is an object of the invention to provide a process for producing polymers of vinyl-type monomers which have relatively high and uniform molecular weights. It is a further object to provide an efficient and economical method for producing polymers of the above-described photopolymerizable vinyl-type monomers which have a substantially uniform molecular weight. It is a further object to provide a method for producing a new type of copolymer of the above-described photopolymerizable vinyl-type monomers. It is still a further object of the invention to provide polymers of the above-described photopolymerizable vinyl-type monomers which possess many improved properties. Other objects and advantages of the invention will be apparent from the detailed description given hereinafter.

It has now been discovered that these and other objects may be accomplished by the process of the invention which comprises exposing the above-described photopolymerizable vinyl-type monomers to light for a short period of time under specific conditions described hereinafter, and then removing the light and continuing the polymerization in the dark. Polymers produced by this process are made up of particles having a high and uniform molecular weight and the said polymers are easily processed to produce resins having superior physical properties.

The process of the invention is based upon the discovery that when members of the above-described group of vinyl-type monomers are exposed for a short period to light, under specific conditions described hereinafter, they form many active polymer nuclei having an indefinite lifetime and when the light is removed these nuclei continue to add monomer in the ordinary manner. As most of the active polymer nuclei are formed during the short exposure period they will all have substantially the same period of growth and the polymer particles formed in the reaction will have substantially the same molecular weight.

The discovery that this particular group of vinyl-type monomers could form polymer nuclei having an indefinite lifetime was indeed surprising for it had been previously considered that the polymer nuclei formed from the vinyl monomers had a life span of only a few seconds. When many of the common vinyl-type monomers, such as vinyl chloride, acrylonitrile and methyl acrylate, for example, are exposed to ultraviolet light for a short period and then placed in the dark the active polymer nuclei formed during the exposure are readily terminated and the polymerization continues only by the formation of new polymer nuclei. The surprising difference in the life span of the polymer nuclei formed from these various vinyl-type monomers is illustrated in the examples cited hereinbelow.

The monomers to be polymerized by the process of the invention comprise the photopolymerizable vinyl-type compounds comprising monomers having a terminal methylene group joined through an ethylenic linkage to a carbon atom which is joined to a substituent other than hydrogen and to a carbon atom of an organic radical, and monomers having a terminal methylene group joined to an aliphatic carbon atom through an ethylenic linkage which is in conjugated relationship with another carbon-to-carbon ethylenic linkage. Examples of this particular group of vinyl-type monomers are 2-chloropropene-1, 2-chlorobutadiene-1,3, 2-chlorobutene-1, alpha-chlorostyrene, isoprene, butadiene, dimethylbutadiene, methallyl chloride, methallyl acetate, ethallyl benzoate, alpha-chloroallyl caproate, dimethallyl phthalate, 3-methallyl-cyclohexanone, alpha-chloro-4-ethylstyrene, alpha-chloroacrylonitrile, butyl 4 - chloro - 4 - pentenoate, ethyl alpha-bromoacrylate, alpha-methyl-4-methoxystyrene, alpha-methoxystyrene, alpha-acetyl - alpha - cyanostyrene, alpha - ethenylstyrene, 2-cyanoallyl acetate, 2-ethenylbutene-1, alpha-phenylstyrene, butyl alpha-chloroacrylate, 2 - bromo - 1 - hepten - 3 - one, 4 - methallyl-benzonitrile, 4 - chloro - 4 - pentenamide, 4 - amyl - 4 - pentenamide, 4 - butyl - 4 - penten-2 - one, 4 - iodo - 4 - pentenamide, 3 - fluoro - 3 - butenenitrile, 3 - chloro - 3 - butenenitrile, 5 - isopropyl - 5 - hexenenitrile, 3 - alpha-chloro-vinyl - 1 carbethoxycyclohexane, 4 - methallyl-1 - acetoxybenzene, 4 - carbamyl - 2 - butyl-1 butene, alpha - methylvinyl - cyclopentane, beta-chloroallylbenzene, 4 - carboxy - 2 - chloro - 1 - pentene, 4 - methallyl - benzamide, 3 - alpha-methylvinylcyclohexanamide, 2 - methallyl - cyclohexanecarboxamide, 7 - ethallyl - 2 -naphthamide, 7 - ethallyl - 2 -napthonitrile, 2 - alpha-ethylvinylcyclohexanenitrile, 4 - ethallyl - 2 - cyclopentanenitrile, 3 - methallylcyclopentanone, 3 - ethallyl - 1 - acetylbenzene, and 4 - methoxy-4-pentenamide.

The preferred monomers to be polymerized by the process of the invention are the monomers having a terminal methylene group joined through an ethylenic linkage to a carbon atom which is joined through a single bond to a member of the group consisting of a halogen atom and hydrocarbon radicals and is joined through the remaining single bond to the carbon atom of an organic radical which is known to have a high activating influence on vinyl polymerization, such as the carboxy radicals and carboxy-substituted radicals, carbalkoxy radicals and carbalkoxy-substituted radicals, cyano and cyano-substituted radicals, the amide and amide-substituted radicals, and the alkenyl radicals. These preferred monomers may be exemplified by butyl 2-methyl-2-propenoate, ethyl 3-methyl-3-butenoate, isobutyl 4-ethyl-4-pentenoate, amyl 4-butenyl-4-pentenoate, methallyl acetate, ethallyl benzoate, dimethallyl phthalate, 2-methyl-2-propenenitrile, 3-hexenyl-3-butenenitrile, 4-butyl-4-pentenenitrile, 2-methallyl-1-carboethoxybenzene, 3-ethallyl-2-naphthamide, 5 - isopropyl-5-hexenenitrile, 2-methyl-2-propenamide, 3-ethyl-3-butenamide, 3-hexenyl-3-butenamide, 2 - methallyl-benzonitrile, 4 - isobutyl-4-pentenamide, 4-amyl-4-pentenamide, 3-methyl-3-buten-2-one, 3-ethyl-3-buten-2-one, 2-methallyl-cyclohexanone, 4-butyl-4-penten-2-one, 4-isopropyl-4-penten-3-one, 5-amyl-5-penten-2-one, and 5-ethyl-5-penten-4-one.

A particularly preferred group of vinyl-type monomers to be polymerized by the process of the invention are those of the general formula $$CH_2=\underset{\underset{Y}{|}}{\overset{\overset{X}{|}}{C}}$$

wherein X is a member of the group consisting of halogen atoms and alkyl radicals and Y is a member of the group consisting of —$(CH_2)_nCN$ radicals,

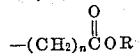

radicals,

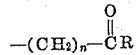

radicals,

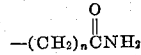

radicals, and alkenyl radicals, the $n$ in the foregoing radicals being an integer from 0 to 5 and R is a hydrocarbon radical, preferably alkyl radicals containing 1 to 8 carbon atoms. Examples of this particularly preferred group of monomers are methacrylonitrile, methyl methacrylate, 4-ethyl-4-pentenoate, amyl 4-amyl-4-pentenoate, 4-butyl-4-pentenenitrile, 4-chloro-4-pentenoate, 4-isobutyl-4-pentenamide, 4-amyl-4-pentenamide, 3-chloro-3-buten-2-one, and 4-isopropyl-4-penten-3-one.

The process of the invention may be utilized to homopolymerize any of the above-described vinyl-type monomers or it may be used to copolymerize two or more different vinyl-type monomers in a variety of proportions. The process of the invention may also be used to copolymerize the above-described monomers with polymerizable unsaturated organic compounds containing at least one >C=C< group, such as maleic acid, maleic acid esters, tetrahaloethylene, and the like. Particularly preferred monomers to be copolymerized with the above-described monomers are those containing at least one $CH_2=C<$ group in their molecule. Examples of this group of monomers are styrene, dichlorostyrene, vinyl naphthalene, vinyl phenol, acrylic acid and its esters, acids such as methyl acrylate, and propyl acrylate; the vinylidene halides, such as vinylidene chloride, vinylidene bromide, and vinyl esters of the inorganic acids, such as the halogen acids and hydrocyanic acids, as vinyl chloride, vinyl bromide, and vinyl fluoride, acrylonitrile, the vinyl esters of the monocarboxylic acids, such as vinyl acetate, vinyl chloroacetate, vinyl benzoate, vinyl valerate, the vinyl esters of the polycarboxylic acids, such as divinyl succinate, divinyl adipate, vinyl allyl phthalate, vinyl methallyl pimelate; the allyl esters, such as diallyl phthalate, allyl acetate, diallyl succinate, and the like. These monomers may be added in a variety of proportions, such as for example, 1% to 95% by weight of the total amount to be polymerized.

In the production of the above-described types of copolymers the monomer or monomers differing from the initial monomer may be added to the reaction mixture before it is exposed to the light or the monomer or monomers may be added any time thereafter. If there is substantially no unpolymerized initial monomer present when the dissimilar monomer or monomers are added to the reaction mixture an entirely new type of copolymer will be produced. It has been found that after substantially all of the initial monomer has been added to the polymer nuclei the said polymer nuclei are still active and if another type monomer is then added the chain will continue to grow by the addition of this monomer. As a result the finished product will be a copolymer made up of one entire section of the initial monomer and another section made up substantially of the second monomer, i. e. having a structure —AAAAABBBBB— wherein A is the initial monomer and B is the monomer added after the completion of the first polymerization. These copolymers differ in molecular structure from the conventional copolymers produced by a mere mixing of the different monomers at the start of the polymerization reaction. In this case the monomers add to the polymer chain at random and the resulting polymer has the structure exemplified by —ABAABBAB—.

The different molecular structure of the copolymers of the invention endow the said polymers with properties which are entirely different from those possessed by the conventional copolymers. The conventional copolymers, for example, in most cases lose the characteristic properties of the homopolymers of monomers making up the said copolymer and assume properties which are entirely different. The copolymers of the invention, on the other hand, retain many of the characteristic properties of the homopolymers of the individual monomers. A copolymer of polymethacrylonitrile and polyacrylonitrile produced by the process of the invention will, for example, possess the characteristic properties of both the polymethacrylonitrile and polyacrylonitrile.

An important application of the process of the invention is its use in the production of "internally" plasticized polymers, i. e. polymers wherein the plasticizer is joined to the said polymer by a primary chemical bond. The production of this type of polymer is accomplished by selecting as the initial monomer, i. e. the one to be exposed to the light, one which forms a soft, plasticizing polymer, such as methyl methacrylate, and adding the monomer which forms the hard, brittle polymer to the reaction mixture after the intial monomer has been substantially polymerized, or the initial monomer added may be the one to form the brittle polymer and the added monomer may be the one to form the flexible polymer. The plasticized polymers of the invention are a considerable improvement over the plasticized compositions produced by the conventional methods. One of the conventional methods for producing the plasticized polymers comprises copolymerizing the desired monomer with a small quantity of a plasticizing monomer, such as methyl methacrylate. This method is unsatisfactory in that the plasticizing monomer is intermingled at regular intervals throughout the polymer structure and the resulting polymer possesses properties different from the properties of the homopolymers. The plasticized polymers of the invention are entirely free of this difficulty for in these cases the plasticizing monomer is added only in a small complete section at the end of the polymer chain and the characteristic properties of the original polymer are not disturbed by the addition of the plasticizer.

Examples of monomers which form flexible homopolymers and are suitable for use in the production of the above-described internally plasticized polymers are methyl methacrylate, vinyl acetate, vinyl propionate, vinyl butyrate, methyl acrylate, and the like.

To distinguish between the two types of copolymers the novel copolymers of the invention will be referred to throughout the specification and claims as, for example, copolymers of polymeric A and polymeric B, while the conventional copolymers will be referred to as, for example, copolymers of A and B.

According to the process of the invention the above-described monomer or monomers are exposed for a short time to light under specific conditions described below and then the light is removed and the polymerization continued in the dark. As used throughout the specification and claims the expression "light" is meant light having wave lengths in the ultraviolet, visible and infrared portions of the spectrum. The more preferred light rays in the ultraviolet region have wave lengths of at least about 1800 Angstroms. The most effective light waves in the infrared region are those below about 7000 Angstroms. Particularly preferred light rays are those having wave lengths between 2500 Angstroms and 5000 Angstroms.

The particular type of light employed will depend in most cases upon the opacity or transparency of the walls of the reaction chamber. In general, light which contains wave lengths higher than those to which the transparent material is partially or completely opaque is necessary. When ordinary soft-glass is employed as the walls of the reaction chamber, for example, the light reaching the reactants is largely that containing wave lengths greater than 3200 Angstroms.

The intensity of the light applied to the reactants will vary over a considerable range depending upon the particular type monomer or monomers being polymerized. Many of the above-described monomers are quite susceptible to photopolymerization and only require the use of light of a relatively low intensity. Other monomers are more difficult to photopolymerize and may require light of a relatively high intensity in order to obtain a satisfactory rate of formation of the active polymer centers. It is generally desirable, however, not to utilize light of too high intensity as such light generally gives rise to a very rapid rate of formation of the active centers and this in turn is detrimental to the formation of the desired long-lived polymer radicals. In the polymerization of monomers, such as methacrylonitrile, methyl methacrylate and methyl isopropenyl ketone, using a reaction chamber having walls of ordinary soft-glass, the use of a source of ultraviolet light placed from 2 cm. to 10 cm. directly in front of the reaction chamber has proved satisfactory.

The period of exposure to the light will vary over a considerable range but should be as short as possible in order to insure that substantially all of the long-lived polymer radicals are formed at about the same time and have an opportunity to grow to the same length. When the process is operated in a continuous manner wherein the monomers are allowed to flow past a series of quartz light bulbs the initial period of exposure will only be a matter of few minutes, e. g., 1 to 3 minutes. In a static operation, however, where light of a smaller intensity will generally be utilized the period of exposure will be much longer, e. g. 25 minutes to 5 hrs.

The temperature employed during the initial exposure to the light may vary over a very wide range. Many of the monomers are not thermally polymerizable and in those cases the process will be relatively independent of the temperature employed. If the monomers can be thermally polymerized extremely high temperatures should be avoided as the give rise to undesirable bulk polymers. In general, temperatures between 10°

C. and 100° C. give satisfactory results. The exact temperature to be employed may best be determined for each individual case by a few routine determinations.

The temperature employed after the polymerizable mixture has been exposed to the light source will also vary over a very wide range. As many of the monomers are not thermally polymerizable the use of the high temperatures will merely increase the rate of polymerization and not have any effect on the formation of new polymer nuclei. If the monomers polymerize thermally then the temperature should not be too high as new polymer nuclei would be formed thereby. In general, temperatures ranging from 10° to 100° C. give satisfactory results. Particularly preferred temperatures for the thermally polymerizable monomers vary from 10° C. to 25° C. The exact temperature to be employed, however, may best be determined for each individual case by a few routine determinations.

The process of the invention may be conducted in any type medium, e. g. in an aqueous emulsion or suspension, in a solvent or in the presence of the monomers themselves, provided that the medium selected is a relatively poor solvent for the finished polymer. The formation of long-lived polymer radicals occurs only when precipitation or gelation of the polymer takes place. As many of the vinyl polymers are relatively insoluble in water the polymerization is preferably conducted in an aqueous emulsion or suspension system. Many of the polymers are also insoluble in solvents, such as cyclohexane, butane, hexane, and benzene, or are insoluble in the monomers themselves, and these mediums may also be utilized.

Polymerization catalysts are not essential to the success of the process but may be utilized if desired. If the catalysts are employed they should be utilized in only relatively small concentrations as high catalyst concentrations are detrimental to the formation of the long-lived polymer radicals. Examples of the polymerization catalyst that may be employed are the peroxides, such as benzoyl peroxide, acetyl peroxide, hydrogen peroxide, tert-butyl peroxide, the peracids, such as persulfuric acid, peracetic acid, and perphthalic acid; the per-esters, such as tert-butyl perbenzoate, and the like. Mixtures of catalysts may also be used. The amount of catalyst in general, should not exceed 1.5% by weight of the monomer being polymerized but the exact amount of catalyst that can be tolerated in the process may be calculated for each individual case by a few routine determinations.

If desired photosensitizers may also be added to the reaction mixture. Examples of such materials are lead tetraethyl, diacetyl, phenylglyoxal, glyoxal, acetone, vat dyes, aliphatic azo compounds, and the like. In most cases the photosensitizers will be employed in amounts varying from about 0.01% to 5% by weight of the material being polymerized.

Various types of additives may be added to the reaction mixture before or at any time during the polymerization reaction provided the addition of such additives does not interfere with the formation of or destroy the already formed long-lived polymer radicals. These additives include emulsion stabilizers, such as polysaccharides, gum arabic, soluble starch, dextrine, lubricants, dyes, pigments, plasticizers, such as dioctyl phthalate, tricresyl phosphate, and the like. The nature and amount of the additives will depend upon the monomer being polymerized and the intended use of the final product.

When the process of the invention is employed for the production of the new type of copolymers described hereinabove the polymerization of the monomers in the initial reaction mixture is continued until there is substantially no unpolymerized monomer present in the reaction mixture and then the dissimilar monomer or monomers are added to the reaction mixture in the dark and the polymerization is continued under the same type of conditions. Freeing the reaction mixture of the initial monomer may be accomplished by continuing the polymerization until substantially all the monomer has been polymerized, or interrupting the polymerization and removing the monomer by any suitable means. The expression "substantially all" as used throughout the specification and claims in regard to the polymerization of the initial monomer, or to the removal of the unpolymerized initial monomer from the reaction mixture is meant such a complete removal or polymerization as can generally be accomplished, e. g. a polymerization of at least 94%, or a removal of all but 6% of the monomer.

If the dissimilar monomer utilized in the production of the above-described copolymers is a vinyl-type monomer of the special group described above the copolymer produced will in turn be a long-lived polymer radical and a third dissimilar monomer may be added to form a three component copolymer. The process may be continued in the same manner to form a four, five six, etc., component copolymer.

At the completion of the reaction the polymers may be recovered from the reaction mixture by any suitable means, such as filtration, coagulation, extraction, etc.

As stated hereinabove it is usually preferred to accomplish the process of the invention in an aqueous emulsion as the necessary conditions for the production of the long-lived polymer radicals are more easily obtained in that type of polymerization reaction. According to this preferred process the monomer or monomers to be polymerized are added to water and an emulsifying agent, the resulting mixture exposed to the light for the required length of time, and then the light is removed and the polymerization is continued in the dark.

It is usually desirable to maintain a low ratio between the amount of monomer and amount of water present in the initial aqueous emulsion, e. g. between 1:2 and 1:5, preferably 1:3. With lower phase ratios there is more monomer available per long-lived radical and the polymer chain is able to grow to a higher molecular weight.

Emulsifying agents, that may be employed in the preferred process, include the soaps, such as sodium and potassium myristate, laurate, palmitate, oleate, stearate, rosinate, and hydroabietate; the alkali metal alkyl or alkylene sulfates, such as sodium lauryl sulfate, potassium stearyl sulfate, the alkali metal alkyl or alkylene sulfonates, such as sodium lauryl sulfonate, potassium stearyl sulfonate, and sodium cetyl sulfonate, sulfonated mineral oil, as well as the ammonium salts thereof; and salts of higher amines as lauryl amine hydrochloride and stearyl amine hydrobromide.

The amount of the emulsifying agent to be employed in the polymerization mixture will vary over a considerable range depending upon the particular material being polymerized, the amount of water present in the mixture and the type and amount of other ingredients added thereto. In general, the amount will vary from 0.1% to 5% by weight of monomer. The preferred amount of emulsifying agent to be employed will vary between 0.1% to 1% by weight of monomer.

The light rays employed in the preferred process are those having wave lengths in the range of 2000 to 6000 Angstroms, particularly those within the range of 2500 to 5000 Angstroms.

The polymers formed in the aqueous emulsion will generally appear as a latex which may be recovered by any suitable means comprising coagulation with electrolytes, solvents, freezing, and the like.

The polymers produced by the process of the invention will have a high and substantially uniform molecular weight. They may be readily molded, etc., to produce resins having many superior mechanical properties, such as tensile strength, hardness, and the like. The resins may be cut, milled and machined to produce various articles of commerce, such as machine parts, tools, toys, containers, articles of furniture, and the like. In the molten or solvent solution the resins may also be utilized in the preparation of impregnating agents, laminating agents, and improved surface coating compositions, such as paints, enamels and lacquers. They may also be subjected to extrusion and to injection and compression molding in the presence or absence of added diluents and plasticizers.

To illustrate the manner in which the invention may be carried out the following examples are given. It is to be understood, however, that the examples are for the purpose of illustration and are not to be regarded as limiting the invention in any way.

In each of the following experiments the reaction mixtures were irradiated by placing the reaction chamber consisting of plain glass bottle about 1 inch away in air from a lamp from which the Pyrex jacket had been removed. The light rays were played on the aqueous emulsions and the mixtures were shakened once or twice an hour during irradiation to saturate the aqueous emulsion with monomer. The initial exposure was accomplished at room temperature.

The reactions were completed in the substantial absence of oxygen. This was accomplished either by withdrawing the air from the reaction chamber or by bubbling nitrogen through the reaction mixture.

The polymers were coagulated by freezing at −20° C. or by precipitation with sodium chloride at 90° C.

The polymers of methacrylonitrile were fractionated by dissolving samples of the polymer in a mixture of 1100 parts of acetone and 160 parts parts of isopropanol and slowly adding 75 parts to 1100 parts of 1:1 mixture of acetone and isopropanol. The precipitate was allowed to settle for 24 hours and then separated. To the supernatant liquid was added 30 to 50 parts of the same mixture of acetone and isopropanol and the precipitate formed was again separated. The supernatant liquid was again subjected to precipitation as described above.

*Example I*

(a) About 100 parts of vinyl chloride were mixed with 300 parts of water and 0.6 part of sodium lauryl sulfate and the resulting mixture emulsified and maintained at 50° C. No polymerization was observed under these conditions.

(b) An aqueous emulsion containing the same ingredients and proportions as shown in (a) above was exposed to ultraviolet light for 3 hours and then the light was removed and the reaction mixture placed in the dark at 50° C. Polymerization was observed during the irradiation period but when the light was removed the polymerization stopped as in (a) above.

(c) About 100 parts of methacrylonitrile were mixed with 300 parts of water and 1 part of sodium lauryl sulfate and the resulting mixture emulsified and maintained at 50° C. No polymerization was observed under these conditions.

(d) An aqueous emulsion containing the same ingredients and proportions as shown in (c) was exposed to ultraviolet light for 3 hours and then the light was removed and the reaction mixture placed in the dark at 50° C. Polymerization was observed during the irradiation and when the light was removed the polymerization continued at approximately the same rate until the monomer had been substantially completely polymerized.

The fact that the methacrylonitrile continued to polymerize at a rapid rate after the light had been removed was quite surprising as it was expected that as soon as the ultraviolet light had been taken away the polymerization would cease as was the case with vinyl chloride in (b) above. Under the conditions employed the sudden change in the course of polymerization after the removal of the light can only be attributed to the formation of long-lived polymer radicals in the mixture containing methacrylonitrile.

*Example II*

About 100 parts of methacrylonitrile were mixed with 300 parts of water and 1 part of sodium lauryl sulfate and the resulting mixture exposed at 25° C. to ultraviolet light for 3 hours and then the light was removed and the reaction continued in the dark at 50° C. The polymethacrylonitrile formed by this reaction was fractionated according to the process described above. The results are indicated in the table below.

| Fraction | Percent of Polymer | $[n]$ Acetone | Mol weight $\times 10^6$ |
| --- | --- | --- | --- |
| 1 | 83.4 | 9.4 | 4.33 |
| 2 | 2.7 | 4.3 | 1.98 |
| 3 | 14.0 | 3.0 | 1.38 |
| orig | 100 | 8.9 | 4.10 |

As indicated most of the polymer was in one high molecular weight fraction which could not be further fractionated. The low molecular weight fraction was probably dead polymer formed during irradiation period and polymer degradation during fractionating procedure. Substantially no polymer of intermediate molecular weight was obtained.

A similar mixture was irradiated and placed in the dark and samples were withdrawn at periodic intervals. The molecular weight of the polymer isolated from these samples showed a continuous increase with time, increasing from about 500,000 to about 4,000,000 after 30 hours at 50° C.

*Example III*

About 100 parts of methyl methacrylate were mixed with 300 parts of water and 1 part of sodium lauryl sulfate and the resulting mixture exposed at 25° C. to ultraviolet light for 4 hours and then the light was removed and the reaction continued in the dark at 50° C. The polymerization continued in the dark at a rate of about 2% per hour which increased slowly with time. Another sample without irradiation polymerized at the rate of 2% per hour only after 14 hours of heating.

*Example IV*

About 100 parts of methacrylonitrile were mixed with an equal volume of cyclohexane and the resulting mixture exposed to ultraviolet light for about 3 hours. At the end of this period the mixture was placed in the dark at room temperature. The polymerization continued at a relatively rapid rate during the darkened period. Polymethacrylonitrile obtained by this process had a very high and uniform molecular weight.

*Example V*

About 100 parts of methyl isopropenyl ketone are mixed with 300 parts of water and 1 part sodium lauryl sulfate and the resulting mixture emulsified and exposed to ultraviolet light for about 3 hours. At the end of the 3 hours the light is removed and the mixture placed in the dark at a temperature of about 25° C. The resulting polymer possesses a relatively high and uniform molecular weight.

*Example VI*

About 100 parts of methacrylonitrile were mixed with 600 parts of water and .3% sodium lauryl sulfate and the resulting mixture irradiated at 25° C. for 7 hours. At the end of this period the mixture was placed in the dark at 50° C. until the polymerization was complete. About 100 parts of freshly distilled deoxygenated acrylonitrile were then added and the resulting mixture further polymerized in the dark at 50° C. The resulting product was a copolymer of polymethacrylonitrile and polyacrylonitrile.

The addition of the acrylonitrile to the active polymethacrylonitrile nuclei was indicated by the fact that under the above-described conditions acrylonitrile would not thermally polymerize. Samples of the copolymer were almost completely insoluble in acetone, a solvent for polymethacrylonitrile.

*Example VII*

The same process was accomplished as in the preceding example with the exception that freshly distilled deoxygenated methyl methacrylate was added to the reaction mixture instead of acrylonitrile. The product obtained was a copolymer of polymethacrylonitrile and polymethyl methacrylate. Benzene, a solvent for polymethyl methacrylate but not polymethacrylonitrile, dissolved less than 5 per cent of the copolymer. This indicated that the polymethyl methacrylate was combined with polymethacrylonitrile and was not present as an independent homopolymer.

*Example VIII*

The same process is accomplished as in Example VI with the exception that deoxygenated vinyl acetate is added to the reaction mixture in place of acrylonitrile. The product obtained is a copolymer of polymethacrylonitrile and polyvinyl acetate. This internally plasticized copolymer is compared in properties and flexibility with a conventional copolymer of methacrylonitrile and vinyl acetate. The internally plasticized copolymer possesses substantially the same flexibility as conventional copolymer and in addition possesses many of the more desirable characteristics of polymethacrylonitrile not possessed by the other copolymer.

*Example IX*

About 100 parts of methyl methacrylate were mixed with 600 parts of water and 0.3% sodium lauryl sulfate and the resulting mixture irradiated at 50° C. The mixture was then placed in the dark at 50° C. until there was substantially no unpolymerized monomer present in the reaction mixture. About 100 parts of freshly distilled deoxygenated methacrylonitrile were added to the mixture and the polymerization continued in the dark at 50° C. The resulting product was a copolymer of polymethyl methacrylate and polymethacrylonitrile.

This reaction must be attributed to the formation of long-lived polymethyl methacrylate radicals, as methacrylonitrile does not polymerize thermally under the experimental conditions. This contention is further supported by the fact that the copolymer was completely insoluble in benzene, a solvent for polymethyl methacrylate but not for polymethacrylonitrile.

*Example X*

About 100 parts of methacrylonitrile are mixed with 800 parts of water and 0.3% sodium lauryl sulfate and the mixture exposed to ultraviolet light for 2 hours. After this period the mixture is placed in the dark at 30° C. until there is substantially no unpolymerized monomer present in the reaction mixture. About 100 parts of freshly distilled deoxygenated methyl methacrylate are added and the resulting mixture further polymerized in the dark at 30° C. At the completion of the polymerization 100 parts of acrylonitrile are added and the mixture further polymerized in the dark. The resulting product is a copolymer of polymethacrylonitrile, polymethyl methacrylate and polyacrylonitrile.

*Example XI*

About 100 parts of methyl alpha-chloroacrylate are mixed with 300 parts of water and 1 part of sodium lauryl sulfate and the mixture exposed to ultraviolet light for 3 hours. After this period the mixture is placed in the dark at 20° C. until the polymerization is complete. The resulting polymer has a high and uniform molecular weight.

I claim as my invention:

1. A process for polymerizing methacrylonitrile which comprises irradiating, with light of wave length in a range of 1800 to 7000 Angstroms, an aqueous emulsion consisting essentially of water, an emulsifying agent and monomeric methacrylonitrile and containing no material which activates polymerization solely under the influence of light for about three hours, removing the light and continuing the polymerization in the dark at a temperature which does not give rise to the formation of a substantial quantity of new polymer nuclei of methacrylonitrile until substantially all of the methacrylonitrile has been polymerized.

2. A process for polymerizing methyl methacrylate which comprises irradiating, with light of wave length in a range of 1800 to 7000 Angstroms, an aqueous emulsion consisting essentially of water, an emulsifying agent and monomeric methyl methacrylate and containing no material which activates polymerization solely under the influence of light for a period up to about five hours, removing the light and continuing the polymerization in the dark at a temperature between 10° C. and 25° C. until substantially all of the monomer has been polymerized.

3. A process for polymerizing methyl isopropenyl ketone which comprises irradiating, with light of wave length in a range of 1800 to 7000 Angstroms, an aqueous emulsion consisting essentially of water, an emulsifying agent and monomeric methyl isopropenyl ketone and containing no material which activates polymerization solely under the influence of light for a period up to about five hours, removing the light and continuing the polymerization in the dark at a temperature between 10° C. and 25° C. until substantially all of the monomer has been polymerized.

4. A process for copolymerizing methacrylonitrile and acrylonitrile which comprises irradiating, with light of wave length in a range of 1800 to 7000 Angstroms, an aqueous emulsion containing monomeric methacrylonitrile for a period up to about five hours, removing the light and maintaining the mixture in the dark at a temperature between about 10° C. and 25° C. until the polymerization is substantially complete, and then adding monomeric acrylonitrile to the reaction mixture and continuing the polymerization in the dark under conditions which do not give rise to the formation of a substantial quantity of new polymer nuclei of acrylonitrile.

5. A process for copolymerizing methacrylonitrile, methyl methacrylate and acrylonitrile which comprises irradiating, with light of wave length in a range of 1800 to 7000 Angstroms, an aqueous emulsion containing monomeric methacrylonitrile for a period up to about five hours, removing the light and maintaining the mixture in the dark until the polymerization is substantially complete, adding monomeric methyl methacrylate to the reaction mixture and continuing the reaction in the dark at a temperature between 10° C. and 25° C. until there is substantially no unpolymerized methyl methacrylate in the reaction mixture and then adding acrylonitrile to the reaction mixture and continuing the polymerization in the dark under conditions which do not give rise to the formation of a substantial quantity of new polymer nuclei of acrylonitrile.

6. A process for polymerizing a photopolymerizable vinyl-type monomer possessing a terminal methylene group joined through a double bond to an aliphatic carbon atom which is joined through a single bond to a substituent other than hydrogen and through the other single bond to a carbon atom of an organic radical, which comprises irradiating, with light of wave length in a range of 1800 to 7000 Angstroms, an aqueous emulsion consisting essentially of water, an emulsifying agent and the said vinyl-type monomer and containing no material which activates polymerization solely under the influence of light for a short period, removing the light and continuing the polymerization in the dark at a temperature which will not give rise to the formation of new polymer nuclei.

7. A process for copolymerizing a photopolymerizable vinyl-type monomer possessing a terminal methylene group joined through a double bond to an aliphatic carbon atom which is joined through a single bond to a substituent other than hydrogen and through the other single bond to a carbon atom of an organic radical, which monomer is capable of forming long-lived polymer free radicals, with a dissimilar unsaturated organic compound containing at least one polymerizable $>C=C<$ group and having some solubility in the homopolymer of the vinyl-type monomer being polymerized, which comprises irradiating, with light of wave length in a range of 1800 to 7000 Angstroms, an aqueous emulsion containing the said vinyl-type monomer for a short period of time, removing the light and continuing the polymerization in the dark at a temperature which will not give rise to the formation of new polymer nuclei of the said monomer, until the said monomer is substantially completely polymerized and then adding the said dissimilar unsaturated organic compound to the reaction mixture and completing the polymerization in the dark under conditions which do not give rise to the formation of a substantial quantity of new polymer nuclei of said dissimilar unsaturated organic compound.

8. A process for polymerizing a photopolymerizable vinyl-type monomer of the group consisting of monomers having a terminal methylene group joined through an ethylenic linkage to a carbon atom which is joined to a substituent other than hydrogen and to a carbon atom of an organic radical, and monomers having a terminal methylene group joined to an aliphatic carbon atom through an ethylenic linkage which is in conjugated relationship with another ethylenic linkage, which monomers are capable of forming long-lived polymer free radicals, which comprises exposing an aqueous emulsion consisting essentially of water, an emulsifying agent and the said vinyl-type monomer and containing no material which activates polymerization solely under the influence of light, to light rich in ultraviolet radiations for a short period, and then removing the light and continuing the polymerization in the dark at a temperature which will not give rise to the formation of new polymer nuclei of the said vinyl-type monomer until substantially all of the vinyl-type monomer has been polymerized.

9. A process for copolymerizing at least one photopolymerizable vinyl-type monomer of the group consisting of monomers having a terminal methylene group joined through an ethylenic linkage to a carbon atom which is joined to a substituent other than hydrogen and to a carbon atom of an organic radical, and monomers having a terminal methylene group joined to an aliphatic carbon atom through an ethylenic linkage which is in conjugated relationship with another ethylenic linkage, which monomers are capable of forming long-lived polymer free radicals, with at least one polymerizable unsaturated organic compound containing a polymerizable $>C=C<$ group, which comprises adding the said vinyl-type monomer to a liquid medium which is a relatively poor solvent for the polymer of the said vinyl-type monomer, exposing the resulting mixture to light for a short period, removing the light and continuing the polymerization in the dark at a temperature which will not give rise to the formation of new polymer nuclei of the said monomer until there is substantially no unpolymerized vinyl-type monomer in the reaction mixture, and then adding the said dissimilar unsaturated organic compound and continuing the polymerization in the dark under conditions which do not give rise to the formation of a substantial quantity of new polymer nuclei of said dissimilar unsaturated organic compound.

10. A process for copolymerizing at least two dissimilar photopolymerizable vinyl-type monomers of the group consisting of monomers having a terminal methylene group joined through an ethylenic linkage to a carbon atom which is joined to a substituent other than hydrogen and to a carbon atom of an organic radical, and monomers having a terminal methylene group joined to an aliphatic carbon atom through an ethylenic linkage which is in conjugated relationship with another ethylenic linkage, which monomers are capable of forming long-lived polymer free radicals, with at least one dissimilar polymerizable unsaturated organic compound containing a polymerizable >C=C< group, which comprises adding the said vinyl-type monomer to a liquid medium which is a relatively poor solvent for the polymer of the said vinyl-type monomer, exposing the resulting mixture to light for a short period of time, removing the light and continuing the polymerization in the dark at a temperature which will not give rise to the formation of a substantial quantity of new polymer nuclei of the said vinyl-type monomer until there is substantially no unpolymerized vinyl-type monomer present in the reaction mixture, adding a dissimilar vinyl-type monomer of the aforedescribed group and continuing the polymerization in the dark under conditions which do not give rise to the formation of a substantial quantity of new polymer nuclei of the said dissimilar vinyl-type monomer until there is substantially no unpolymerized vinyl-type monomer present in the reaction mixture, and then adding the dissimilar unsaturated organic compound to the reaction mixture and continuing the polymerization in the dark under conditions which do not give rise to the formation of a substantial quantity of new polymer nuclei of said dissimilar unsaturated organic compound.

11. The process defined in claim 8 wherein the vinyl-type monomer is a monomer having the general formula

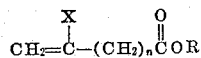

wherein X and R are alkyl radicals and $n$ is an integer from 0 to 5.

12. The process defined in claim 8 wherein the vinyl-type monomer is a monomer having the general formula

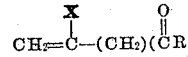

wherein X and R are alkyl radicals and $n$ is an integer from 0 to 5.

13. The process defined in claim 8 wherein the vinyl-type monomer is a monomer having the general formula

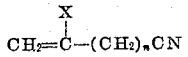

wherein X is an alkyl radical and $n$ is an integer from 0 to 5.

14. A process for copolymerizing a photopolymerizable vinyl-type monomer having a terminal methylene group joined through an ethylenic linkage to a carbon atom which is joined through a single bond to a member of the group consisting of halogen atoms and hydrocarbon radicals and through the other single bond to the carbon atom of an aliphatic organic radical, which monomer is capable of forming long-lived polymer free radicals, with a dissimilar unsaturated organic compound containing at least one polymerizable $CH_2=C<$ group and being able to swell the homopolymer of the vinyl-type monomer to be polymerized, which comprises adding the said vinyl-type monomer to a liquid medium which is a relatively poor solvent for the homopolymer of the said monomer, exposing the resulting mixture to light rich in ultraviolet radiation for a short period, removing the light and continuing the polymerization in the dark at a temperature which will not give rise to the formation of new polymer nuclei of the said vinyl-type monomer until there is substantially no unpolymerized vinyl-type monomer in the reaction mixture, and then adding the said dissimilar unsaturated compound and continuing the polymerization in the dark under conditions which do not give rise to the formation of a substantial quantity of new polymer nuclei of said dissimilar unsaturated organic compound.

15. A process for polymerizing a photopolymerizable vinyl-type monomer of the group consisting of monomers having a terminal methylene group joined through an ethylenic linkage to a carbon atom which is joined to a substituent other than hydrogen and to a carbon atom of an organic radical, and monomers having a terminal methylene group joined to an aliphatic carbon atom through an ethylenic linkage which is in conjugated relationship with another ethylenic linkage, which monomers are capable of forming long-lived polymer free radicals, which comprises adding the said vinyl-type monomer to a liquid medium which is a relatively poor solvent for the homopolymer of the said vinyl-type monomer and which contains no material which activates polymerization solely under the influence of light, exposing the resulting mixture to light rich in ultraviolet rays for a short period, and then removing the light and continuing the polymerization in the dark at a temperature which will not give rise to the formation of a substantial quantity of new polymer nuclei of the said vinyl-type monomers and until substantially all of the monomer has been polymerized.

KENZIE NOZAKI.

References Cited in the file of this patent

UNITED STATES PATENTS

| Number | Name | Date |
| --- | --- | --- |
| 2,160,940 | Britton et al. | June 6, 1939 |
| 2,297,351 | Gerhart | Sept. 29, 1942 |
| 2,344,785 | Owens et al. | Mar. 21, 1944 |
| 2,367,660 | Agre | Jan. 23, 1945 |
| 2,370,562 | Meunier | Feb. 27, 1945 |
| 2,413,973 | Howk | Jan. 7, 1947 |
| 2,460,300 | Le Fevre et al. | Feb. 1, 1949 |
| 2,480,751 | Marks | Aug. 30, 1949 |
| 2,504,054 | Tawney | Apr. 11, 1950 |
| 2,519,092 | Young et al. | Aug. 15, 1950 |